United States Patent [19]

Freeman et al.

[11] Patent Number: 6,139,256
[45] Date of Patent: *Oct. 31, 2000

[54] APPARATUS FOR CONTROLLING THE CONCENTRICITY OF A MEMBER WITH A CENTERING DEVICE

[75] Inventors: Jess L. Freeman, Poway; Donald E. Johnson, Cardiff by the Sea, both of Calif.

[73] Assignee: Solar Turbines Incorporated, San Diego, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/907,221

[22] Filed: Aug. 6, 1997

[51] Int. Cl.⁷ ........................................................ F16J 15/34
[52] U.S. Cl. .......................... 415/111; 415/131; 277/370; 277/398; 29/888.02
[58] Field of Search ................................ 29/464, 888.02; 417/423.12, 423.14; 384/215, 125; 277/370, 371, 375, 398; 415/111, 131, 174.2, 230, 231

[56] References Cited

U.S. PATENT DOCUMENTS

| | | | |
|---|---|---|---|
| 2,203,525 | 6/1940 | Dupree, Jr. | 29/888.02 X |
| 2,830,541 | 4/1958 | Higgins et al. | 417/423.12 X |
| 3,472,169 | 10/1969 | Dyke et al. | 415/174.2 |
| 3,485,051 | 12/1969 | Watkins | 29/464 X |
| 3,847,504 | 11/1974 | Martin | 417/423.12 X |
| 3,881,841 | 5/1975 | Stranitl | 415/131 |

*Primary Examiner*—P. W. Echols
*Attorney, Agent, or Firm*—Larry G. Cain; James B. Golden

[57] ABSTRACT

Conventional gas compressors use dry gas sealing arrangements mounted on a shaft of the gas compressor. Functionally, for the dry gas sealing arrangement to properly seal, the concentricity of shaft and the dry gas sealing arrangement must be maintained at a close tolerance. Past assembly techniques have failed to mount such dry gas sealing arrangement to the shaft in an effective and efficient manner to control the concentricity during operation. The present method and apparatus for controlling the concentricity of a member with a centering device effectively and efficiently controls the concentricity between the member and the shaft. The structure of the centering device includes a first cylindrical portion, a second cylindrical portion and a transition portion. The first cylindrical portion is cantilevered about the shaft and centers a first end of the member. The second cylindrical portion and the transition portion form a mid-support for a second end of said member. Each of the mid-support and the cantilevered structure provide a uniform concentrically mounted member.

16 Claims, 5 Drawing Sheets

Fig-4-

APPARATUS FOR CONTROLLING THE CONCENTRICITY OF A MEMBER WITH A CENTERING DEVICE

TECHNICAL FIELD

This invention relates generally to a gas compressor having a dry gas sealing arrangement mounted on a compressor shaft and more particularly to a centering device for controlling the concentricity between the compressor shaft and the dry gas sealing arrangement.

BACKGROUND ART

Past practice has incorporated thin sheet metal strips or shims positioned around the periphery of a shaft, with the dry gas sealing arrangement pressed over the strips and shaft as a method or attempt to center the dry gas sealing arrangement on the shaft. Common practice was to form dimples or other structures having peaks and valleys in the strips in an attempt to center the dry gas sealing arrangement about the shaft.

During operation, the elasticity of the structure having the dimples, peaks and valleys formed therein was lost and the centering ability of the strips have been known to fail. When the elasticity of the structure is lost, the dry gas sealing arrangement becomes unstable, moves off center and causes the components of the gas compressor to rotate eccentric. The eccentric rotation results in unbalance and effects the operation of the gas compressor to the extended that operation thereof must be discontinued. Thus, the gas compressor must be pulled off line and repaired.

The above systems used therewith are examples of attempts to control the concentricity of dry gas sealing arrangement.

The present invention is directed to overcome one or more of the problems as set forth above.

DISCLOSURE OF THE INVENTION

In one aspect of the invention, a centering device is adapted to center a member on a shaft. The shaft has an outer profile. The centering device is comprised of a generically cylindrical sleeve having a first end and a second end. The sleeve has an inner surface and an outer surface defined between the first end and the second end. A first inner protrusion is axially spaced from the first end a preestablished distance and extends radially inward from the inner surface. A second inner protrusion is axially spaced from the second end a preestablished distance and extends radially inward from the inner surface. A first outer protrusion is axially spaced from the first end a preestablished distance and extends radially outwardly from the outer surface. The first outer protrusion is interposed between the first end and the first inner protrusion. A second outer protrusion is axially spaced from the second end a preestablished distance and extends outwardly from the outer surface. The second outer protrusion is axially interposed the first inner protrusion and the second inner protrusion. The first inner protrusion and the second inner protrusion are in contacting relationship with the outer profile of the shaft. And, the first outer protrusion is cantilevered about the outer profile of the shaft and the second outer protrusion is mid-supported about the outer profile by the first inner protrusion and the second inner protrusion.

In another aspect of the invention, a method of centering a member on a shaft having a centering device positioned therebetween is disclosed. The shaft is comprised of a first end, a second end and an outer profile defining a first raised portion positioned near the first end and a second raised portion positioned between the first raised portion and the second end. The first raised portion has a preestablished diameter and the second raised portion has a preestablished diameter larger than the preestablished diameter of the first raised portion. The centering device is comprised of a first end and a second end. An inner surface and an outer surface is defined between the first end and the second end. A first inner protrusion extends radially inward from the inner surface, has a preestablished diameter and is positioned near the first end. A second inner protrusion extends radially inward from the inner surface, has a preestablished diameter larger than that of the preestablished diameter of the first inner protrusion and is positioned between the first inner protrusion and the second end. A first outer protrusion extends radially outward from the outer surface, has a preestablished diameter and is positioned near the first end. A second outer protrusion extends radially outward from the outer surface, has a preestablished diameter larger than the preestablished diameter of the first outer protrusion and is positioned between the first outer protrusion and the second end. And, the member is comprised of a first end, a second end, an inner surface extending between the first end and the second end of the member. A first protrusion extends radially inward from the inner surface of the member, has a preestablished diameter and is positioned near the first end of the member. A second protrusion extends radially inward from the inner surface of the member, has a preestablished diameter larger than that of the preestablished diameter of the first protrusion and is positioned between the first protrusion and the second end. The method of assembling comprising the following steps: attaching an assembly tool to the centering device; heating the centering device and the assembly tool; positioning the centering device and assembly tool onto the first end of the shaft; positioning the first inner protrusion and the second inner protrusion in axial alignment with the first raised portion and the second raised portion respectively; allowing the assembly tool and the centering device to cool, thus frictionally engaging the first inner protrusion with the first raised portion and the second inner protrusion with the second raised portion respectively; removing the assembly tool; positioning the member onto the first end of the shaft and the first end of the centering device; and positioning the first protrusion and the second protrusion on the member in axial alignment with the first outer protrusion and the second outer protrusion on the centering device respectively.

BEST MODE FOR CARRYINQ OUT THE INVENTION

Figure 1:
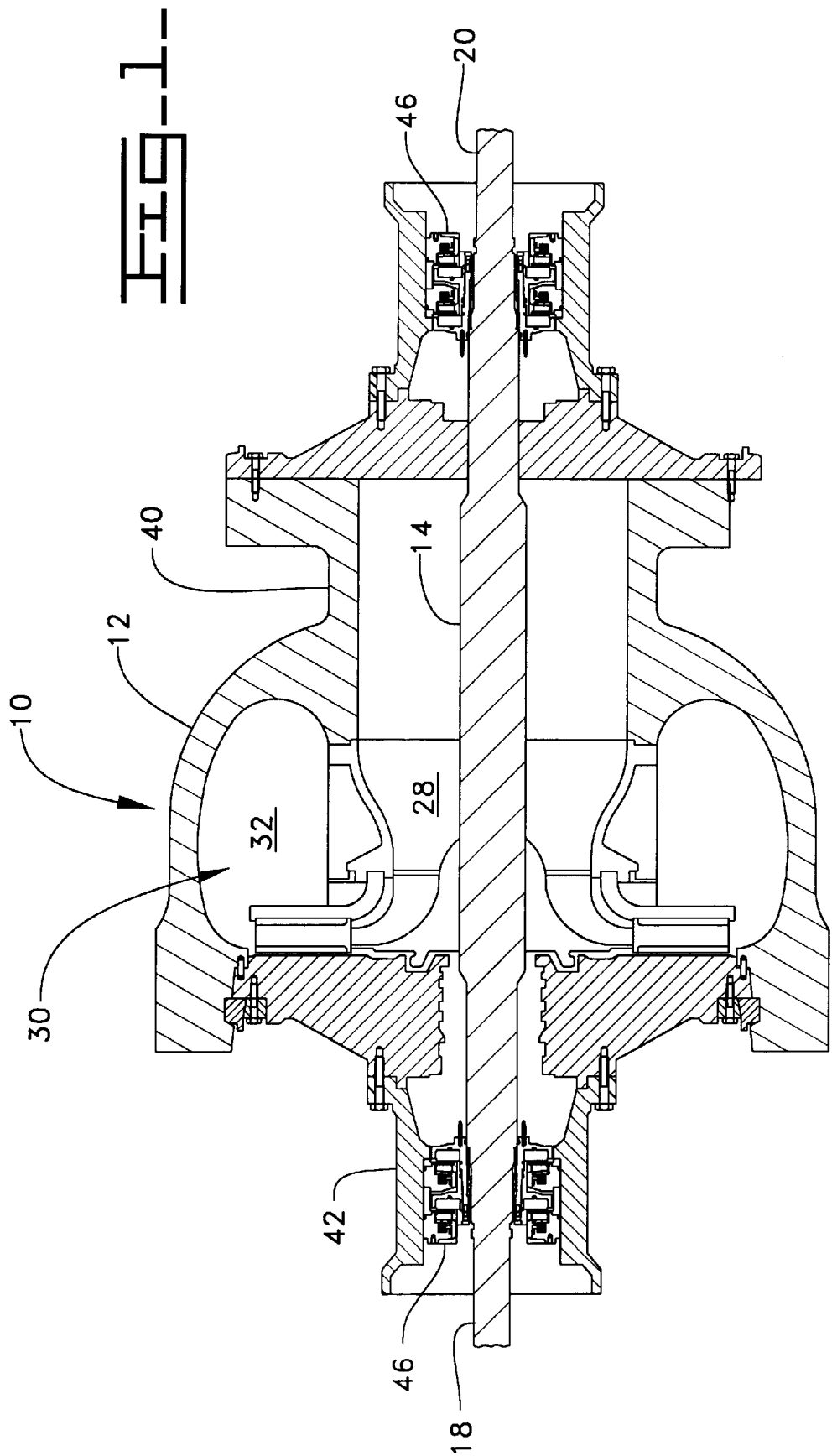
FIG. 1 is a partially sectioned side elevational view of a gas compressor embodying the present invention.
Figure 2:
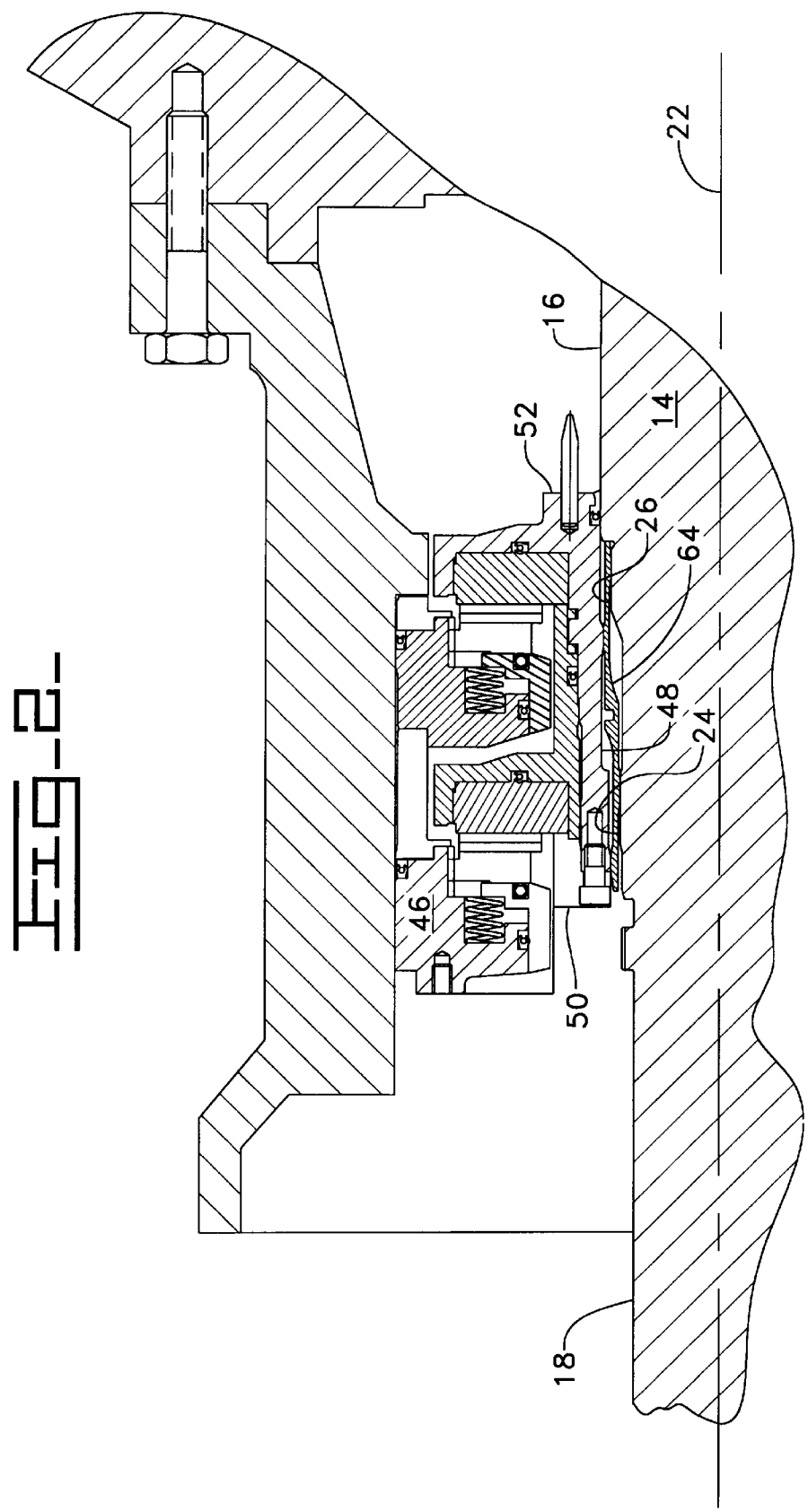
FIG. 2 is an enlarged sectional view of a portion of the gas compressor embodying the present invention.
Figure 3:
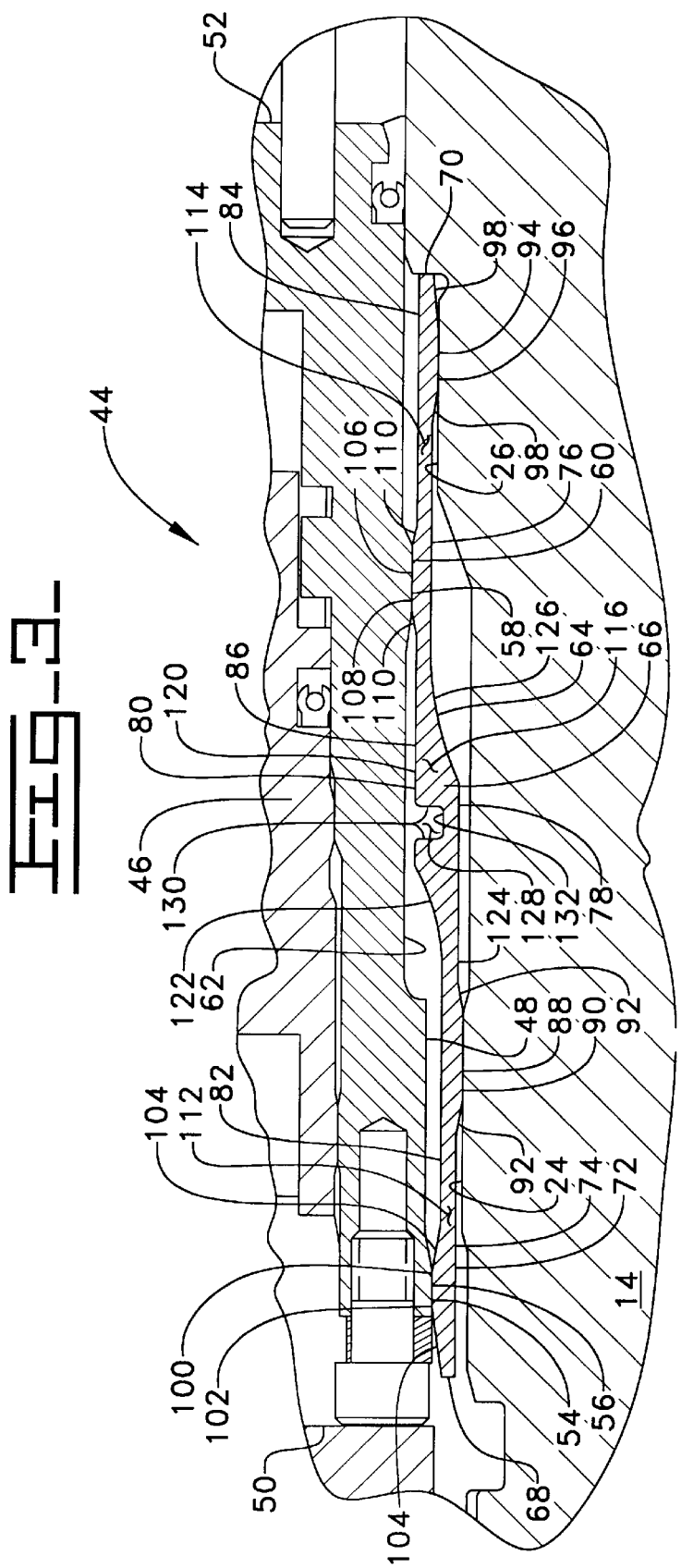
FIG. 3 is an enlarged sectional view of a centering device as depicted in the present invention.

Referring to FIGS. 1 and 2, a gas compressor 10 is shown. The gas compressor 10 includes a housing 12 having a shaft 14 rotatably positioned therein. The shaft 14 includes an outer profile 16 having a stepped configuration. The shaft 14 has a first end 18 and a second end 20 being supported within the housing 12. The shaft 14 defines a central axis 22 and the outer profile 16 includes a first stepped or raised portion 24, as best shown in FIG. 3, which in this application is positioned near each of the first end 18 and the second end 20 of the shaft 14. A second stepped or raised portion 26 is positioned inward the first raised portion 24. As an alternative, either of the first end 18 or the second end 20 could include the first and/or second raised portions 24,26. In this application, the second raised portion 26 has a larger diameter than that of the first raised portion 24. The shaft 14 has a plurality of blades 28 positioned between the first end 18 and the second end 20 and is attached thereto forming a compressor portion 30. The compressor portion 30 could be of either an axial design or a centrifugal design without changing the essence of the invention. Interposed the housing 12, the shaft 14 and the plurality of blades 24 is a cavity 32. The housing 12 includes an inlet end portion 40 being in communication with the cavity 30 and an outlet end portion 42 being in communication with the cavity 30. The inlet end portion 40 includes a sealing arrangement, member or device 44 positioned between the shaft 14 and the housing 12. The outlet end portion 42 includes a conventional dry gas sealing arrangement 46. In this application each of the first sealing arrangement 44 and the dry gas sealing arrangement 46 are of the dry gas sealing type. Therefore in this application, each of the dry gas sealing arrangement 46 and the sealing arrangement 44 need to be centered. Thus, the sealing arrangement 44,46 are devices to be centered. The sealing arrangement 44 and the dry gas sealing arrangement 46 are positioned between the shaft 14 and the cavity 30. As best shown in FIGS. 2 and 3, the dry gas sealing arrangement 46 includes an inner surface 48 extending between a first end 50 and a second end 52. Extending radially inwardly along the inner surface 48 and positioned near the first end 50 is a first protrusion 54 defining a flat surface 56 having a predetermined axial distance. Interposed the first protrusion 54 and the second end 52 and projecting radially inward along the inner surface 48 is a second protrusion 58 defining a flat surface 60 having a predetermined axial distance. The inner surface 48 has a recess portion 62 extending between the first protrusion 54 and the second protrusion 58. In this application, the second protrusion 58 has a larger diameter than that of the first protrusion 54.

Figure 4:
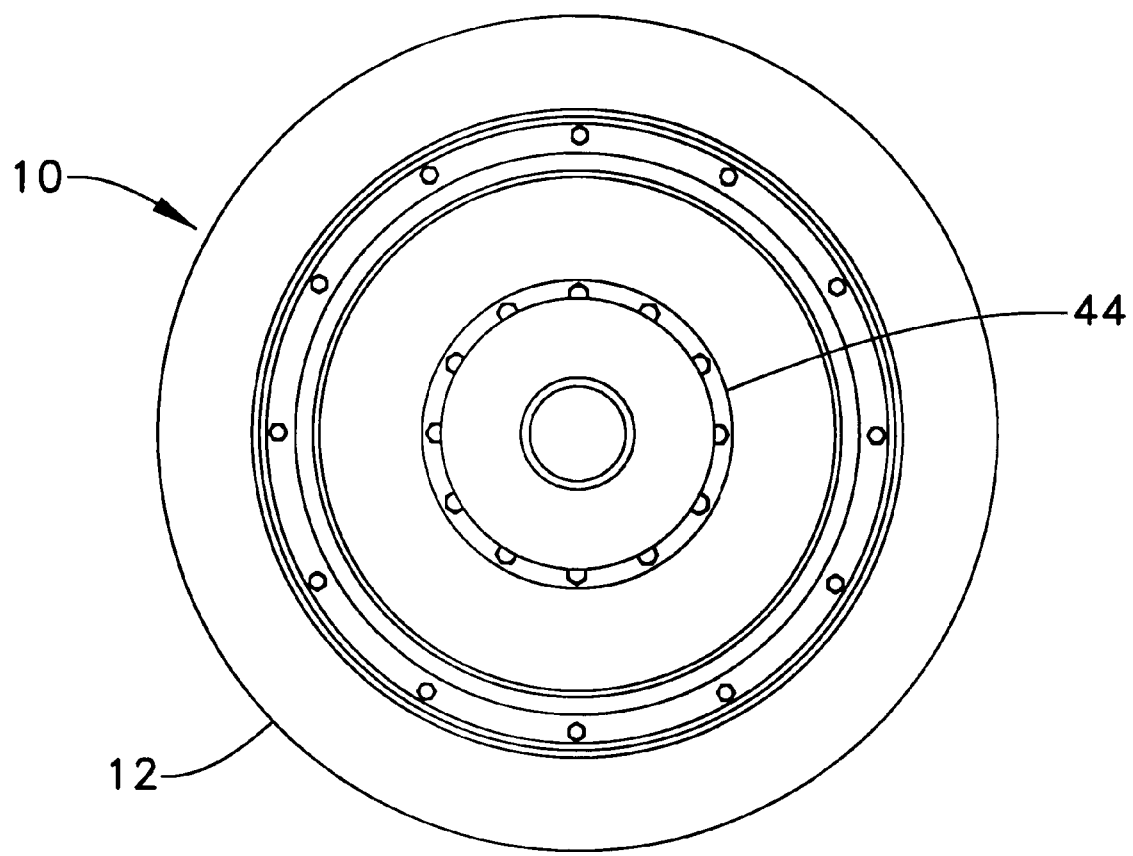
FIG. 4 is an end view of the centering device.

As further shown in FIGS. 3 and 4, positioned between the shaft 14 and the dry gas sealing arrangement 46 is a centering device 64. The centering device 64 includes a spring sleeve 66 having a generally cylindrical configuration defining a first end 68 and a second end 70. Extending generally axially between the first end 68 and the second end 70 is an inner surface 72 defining a first inner cylindrical surface 74 having a preestablished diameter and extending from the first end 68 a preestablished distance, and a second inner cylindrical surface 76 having a preestablished diameter being larger than the preestablished diameter of the first inner cylindrical surface 74 and extending axially from the second end 70 a preestablished distance. An inner transition surface 78 is interposed the first inner cylindrical surface 74 and the second inner cylindrical surface 76 of the inner surface 72. The first inner cylindrical surface 74 and the second inner cylindrical surface 76 are blending connected to the inner transition surface 78. Extending generally axially between the first end 68 and the second end 70 is an outer surface 80 defining a first outer cylindrical surface 82 having a preestablished diameter and extending from the first end 68 a preestablished distance, and a second outer cylindrical surface 84 having a preestablished diameter being larger than the preestablished diameter of the first outer cylindrical surface 82 and extending axially from the second end 70 a preestablished distance. An outer transition surface 86 is interposed the first outer cylindrical surface 82 and the second outer cylindrical surface 84 of the outer surface 80. Axially spaced from the first end 68 a preestablished distance, being interposed the first end 68 and the inner transition surface 78 and extending radially inward from the first inner cylindrical surface 74 of the inner surface 72 is a first inner protrusion 88. The first inner protrusion 88 defines a flat portion 90 having a preestablished axial distance being blendingly connected with the first inner cylindrical surface 74 of the inner surface 72 by a pair of radius 92. Axially spaced from the second end 70 a preestablished distance, being interposed the second end 70 and the inner transition surface 78 is a second inner protrusion 94. The second inner protrusion 94, extends radially inward and defines a flat portion 96 having a preestablished axial distance being blendingly connected with the second inner cylindrical surface 76 of the inner surface 72 by a pair of radius 98.

Axially spaced from the first end 68 a preestablished distance, being interposed the first end 68 and the outer transition surface 86 and extending outwardly from the first outer cylindrical surface 82 of the outer surface 80 is a first outer protrusion 100. The first outer protrusion 100 defines a flat portion 102 having a preestablished axial distance being blendingly connected with the first outer cylindrical surface 82 of the outer surface 80 by a pair of radius 104. Axially spaced from the second end 70 a preestablished distance, being interposed the second end 70 and the outer transition surface 86 is a second outer protrusion 106. The second outer protrusion 106 defines a flat portion 108 having a preestablished axial distance being blendingly connected with the second outer cylindrical surface 84 of the outer surface 80 by a pair of radius 110.

The cylindrical configuration has a generally consistent material thickness between the first inner cylindrical surface 74 of the inner surface 72 and the first outer cylindrical surface 80 of the outer surface 88 and forms a first cylindrical portion 112. The cylindrical configuration has a generally consistent material thickness between the second inner cylindrical surface 76 of the inner surface 72 and the second outer cylindrical surface 82 of the outer surface 80 and forms a second cylindrical portion 114. A transition portion 116 is formed between the inner transition surface 78 and the outer transition surface 86. For example, in this application the material thickness of the first cylindrical portion 112 and the second cylindrical portion 114 is between about 1 mm and 2 mm. The pair of radius 104 blendingly connecting with the first outer protrusion 100 and the pair of radius 110 blendingly connecting with the second outer protrusion 106 has a length being about 15 times the material thickness.

The outer transition surface 86 includes a straight surface 120 being an extension of the second outer cylindrical surface 84 and extending therefrom axially toward the first end 68. A radius 122 blendingly connects the first outer cylindrical surface 82 and the straight surface 120 and follows the circumference of the outer surface 80. The inner transition surface 78 includes a straight surface 124 being an extension of the first inner cylindrical surface 74 and extends therefrom axially toward the second end 70. A radius 126 blendingly connects the second inner cylindrical surface 76 and the straight surface 124. In this application, the straight surface 124 of the inner transition surface 78 and the straight surface 120 of the outer transition surface 86 axially overlap. A radial recess 128 is further positioned in the straight surface 120. The radial recess 128 is positioned in the overlapping axial distance between the radius 122 and the second end 70. A cross-section of the radial recess 128 defines a pair of sides 130 extending from the straight surface 120 of the outer transition surface 86 toward the straight surface 124 of the inner transition surface 78 a predetermined depth. And, a bottom 132 extends axially between the pair of sides 130. Each of the intersections of the pair of sides 130 with the bottom 132 and the straight surface 120 includes a radius or a chamfer.

In this application, the radius 126 between the second inner cylindrical surface 76 and the straight surface 124 of the inner transition surface 78 is about 15 times the material thickness. The radius 122 between the first outer cylindrical surface 82 and the straight surface 120 of the outer transition surface 86 is about 15 times the material thickness.

Figure 5:
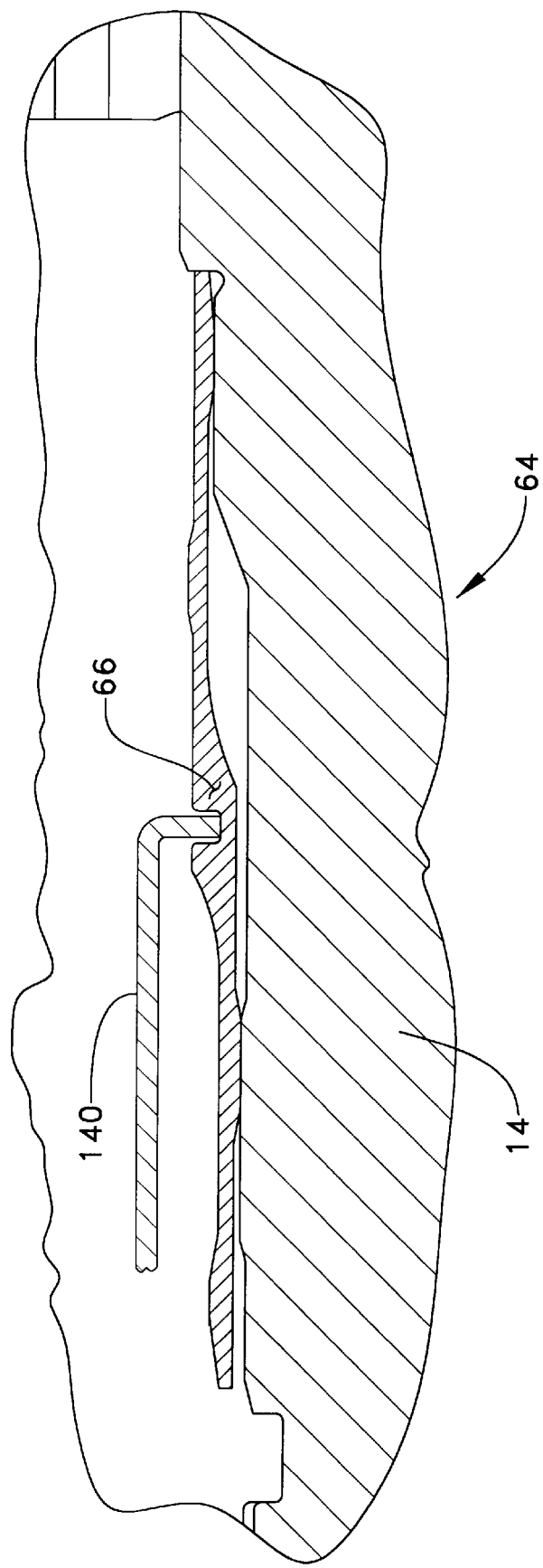
FIG. 5 is a partial view of the assembly tool.

In this application, the centering device 64 is removably attached to the shaft 14. An assembly tool 140, being partially shown in FIG. 5, is used to install and to remove the centering device 64 from the shaft 14. The assembly tool 140 includes a multipiece construction which can be disassembled and removed from the centering device 64.

The first cylindrical portion 112 is radially positioned inwardly from the second cylindrical portion 114 and is axially spaced one from the other by the transition portion 116.

Other aspects, objects and advantages of this invention can be obtained from a study of the drawings, the disclosure and the appended claims.

Industrial Applicability

In operation, the gas compressor 10 is assembled. The centering device 64 is assembled to each of the first end 18 and the second end 20 of the shaft 14. For example, in this application, the multipiece assembly tool 140 is attached to the centering device 64 and the centering device 64 with the tool attached is heated to a preestablished temperature within an oven. The centering device 64, with the aid of the tool is assembled on the ends 18,20 of shaft 14. The first inner protrusion 88 and the second inner protrusion 94 are axially aligned with the first raised portion 24 and the second raised portion 26 respectively. The centering device 64 and the tool are allowed to cool within the atmosphere. This results in the second raised portion 26 on the shaft 14 being in frictional engagement with the flat portion 96 of the second inner protrusion 94 on the second inner cylindrical surface 76 of the inner surface 72 of the spring sleeve 66. And, the first raised portion 24 on the shaft 14 being in frictional engagement with the flat portion 90 on the first inner protrusion 88 on the first inner cylindrical surface 74 of the inner surface 72 of the spring sleeve 66. The assembly tool 140 is removed from the shaft 14 and the shaft 14 with the centering device 64 attached thereto is positioned in the housing 12 and the plurality of blades 28 are attached thereto. The first end 18 of the shaft 14 is supported within the inlet portion end 40 of the housing 12. And the second end 20 of the shaft 14 is supported with the outlet end portion 42 of the housing 12.

The dry gas sealing arrangement 46 is assembled to each of the first end 18 and the second end 20 of the shaft 14. For example, the second end 52 of the dry gas sealing arrangement 46 is axially positioned over the shaft 14 and the centering device 64 and into the respective inlet end portion 40 and outlet end portion 42. The first end 50 of the dry gas sealing arrangement 46 has a force applied thereto and is axially positioned in the assembled position. The assembled position results in the flat surface 60 of the second protrusion 58 on the inner surface 48 of the dry gas sealing arrangement 46 being in frictional engagement with the flat portion 108 of the second outer protrusion 106 on the second outer cylindrical surface 84 of the outer surface 80 of the spring sleeve 66. And, the assembled position further results in the flat surface 56 of the first protrusion 54 on the inner surface 48 of the dry gas sealing arrangement 46 being in frictional engagement with the flat portion 102 of the first outer protrusion 100 on the first outer cylindrical surface 82 of the outer surface 80 of the spring sleeve 66.

Functionally, with the spring sleeve 66 assembled on the shaft 14 and the dry gas sealing arrangement 46 assembled on the spring sleeve 66 the dry gas sealing arrangement 46 remains centered. Operational, with the first inner protrusion 88 extending from the inner surface 72 of the centering sleeve 66 positioned on the first raised portion 24 of the shaft 14, the majority of the first cylindrical portion 112 is cantilevered about the shaft 14 and acts functionally as a spring member. Thus, the first cylindrical portion 112 is generally spaced from the outer profile 16 of the shaft 14. In this application, the spring member is of a cantilevered configuration. Thus, with the first protrusion 54 on the dry gas sealing arrangement 46 surrounding the first outer protrusion 100 on the outer surface 80 of the first cylindrical portion 112 producing the cantilevered spring action the first end 50 of the dry gas sealing arrangement 46 will be functionally centered about the shaft 14 and within the inlet end portion 40 and the outlet end portion 42 of the housing 12. Furthermore, in operation, the second inner protrusion 94 extends from the inner surface 72 of the centering sleeve is positioned on the second raised portion 26 of the shaft 14. And, the first inner protrusion 88 extends from the inner surface 72 of the centering sleeve 66 is positioned on the first raised portion 24 of the shaft 14. This results in, the majority of the second cylindrical portion 114, the transition portion 116 and a small portion of the first cylindrical portion 112 is spaced from the outer profile 16 of the shaft 14 and is supported by the second inner protrusion 94 and the first inner protrusion 88 on the inner surface 72 and acts functionally as a spring member. In this application, the spring member is of an end supported configuration. Thus, with the second protrusion 58 on the dry gas sealing arrangement 46 surrounding the second outer protrusion 106 on the outer surface 80 of the second cylindrical portion 114 and being mid-supported a spring or centering action is produced on the second end 52 of the dry gas sealing arrangement 46. The spring action functionally centers the dry gas sealing arrangement 46 about the shaft 14 and within the inlet end portion 40 and the outlet end portion 42 of the housing 12.

The centering sleeve 64 can be removed from the shaft 4 if desired. For example, the dry gas sealing arrangement 46 is removed from the respective first end 18 and the second end 20. The multipiece assembly tool 140 is positioned within the radial recess 128 and the centering device 64 or in this application the spring sleeve 66 is removed from the respective end 18,20 of the shaft 14 in a conventional manner.

Thus, the dry gas sealing arrangement 46 is centered about the shaft 14 by the spring action of the spring sleeve 66. The spring sleeve 66 with the cantilevered first end 68 centers the first end 50 of the device to be centered, the member or dry gas sealing arrangement 46. And, the mid supported second outer protrusion 106 centers the second end 52 of the device to be centered, the member or dry gas sealing arrangement 46.

Other aspects, objects and advantages of this invention can be obtained from a study of the drawings, the disclosure and the appended claims.

What is claimed is:

1. A gas compressor comprising:

a housing defining a cavity, said housing having an inlet end portion and an outlet end portion in communication with said cavity;

a shaft positioned within said housing and extending through said cavity, said shaft having an outer profile;

a sealing arrangement positioned within at least one of said inlet end portion and said outlet end portion; and a centering device defining a generally cylindrical sleeve positioned about said shaft and within said sealing arrangement, said generally cylindrical sleeve having a first end and a second end, an inner surface and an outer surface defined between said first end and said second end, a first inner protrusion being axially spaced from said first end a preestablished distance and extending radially inward from said outer surface, a second inner protrusion axially spaced from said second end a preestablished distance and extending radially inward from said outer surface, a first outer protrusion axially spaced from said first end a preestablished distance and extending radially outward from said inner surface, said first outer protrusion being between said first end and said first inner protrusion, a second outer protrusion axially spaced from said second end a preestablished distance and extending radially outward from said inner surface, said second outer protrusion being between said first inner protrusion and said second inner protrusion, said first inner protrusion and said second inner protrusion being in contacting relationship with said outer profile of said shaft, said first outer protrusion and said second outer protrusion being in contacting relationship with said sealing arrangement, and said first outer protrusion being cantilevered about said outer profile of said shaft and said second outer protrusion being supported about said outer profile by said first inner protrusion and said second inner protrusion.

2. The gas compressor of claim 1 wherein said generally cylindrical sleeve further includes a first portion having said first outer protrusion and said first portion being positioned near said first end, a second portion having said second outer protrusion and said second portion being positioned near said second end and a transition portion connecting said first portion and said second portion.

3. The gas compressor of claim 2 wherein said first cylindrical portion has a generally uniform cross-sectional area.

4. The gas compressor of claim 2 wherein said second cylindrical portion has a generally uniform cross-sectional area.

5. The gas compressor of claim 1 wherein said first inner protrusion and said second inner protrusion each having a pair of radii blendingly connected with said inner surface.

6. The gas compressor of claim 1 wherein said sealing arrangement is positioned within each of said inlet end portion and said outlet end portion.

7. The gas compressor of claim 1 wherein said first outer protrusion and said second outer protrusion each having a pair of radii blendingly connected with said outer surface.

8. The gas compressor of claim 1 wherein at least one sealing arrangement is a dry gas sealing arrangement.

9. The gas compressor of claim 1 wherein said outer profile of said shaft includes a first raised portion in contacting relationship with said first inner protrusion and a second raised portion being in contacting relationship with said second inner protrusion.

10. The gas compressor of claim 9 wherein said contacting relationship of said first raised portion and said first inner protrusion, and said second raised portion and said second inner protrusion form a spaced relationship between a remainder of said inner surface of the centering device and the outer profile of said shaft.

11. The gas compressor of claim 9 wherein said contacting relationship of said first raised portion and said first inner protrusion, and said second raised portion and said second inner protrusion form a spaced relationship between a remainder of said inner surface of the centering device and the outer profile of said shaft.

12. The gas compressor of claim 10 wherein said first raised portion has a preestablished diameter and said second raised portion has a preestablished diameter larger than that of the first raised portion.

13. The gas compressor of claim 1 wherein each sealing arrangement is a dry gas sealing arrangement.

14. The gas compressor of claim 1 wherein said first inner protrusion, said second inner protrusion, said first outer protrusion, and said second outer protrusion each extend completely about said generally cylindrical sleeve.

15. The gas compressor of claim 1 wherein said inner surface having a first cylindrical surface being spaced from said outer profile of said shaft.

16. the gas compressor of claim 1 wherein said inner surface having a second inner cylindrical surface and an inner transitional surface each being spaced from said outer profile of the shaft.

* * * * *